(12) United States Patent
Lin

(10) Patent No.: US 6,203,155 B1
(45) Date of Patent: Mar. 20, 2001

(54) EYEGLASSES

(76) Inventor: Haan-Yeou Lin, P.O. Box 90, Tainan City (TW)

( * ) Notice: Subject to any disclaimer, the term of this patent is extended or adjusted under 35 U.S.C. 154(b) by 0 days.

(21) Appl. No.: 09/593,597

(22) Filed: Jun. 12, 2000

(51) Int. Cl.[7] .................................................. G02C 1/04
(52) U.S. Cl. ............................................. 351/110; 351/41
(58) Field of Search .......................... 351/110, 41, 111, 351/106, 86, 92

(56) References Cited

U.S. PATENT DOCUMENTS 6,007,200 * 12/2000 Tachibana ............................ 351/110

* cited by examiner

Primary Examiner—Hung Xuan Dang

(57) ABSTRACT

Eyeglasses includes two lenses, a bridge, two nose pads, two temples and plural bolts combined together. The two lenses have respectively a through hole and two insert holes in an inner upper side and a through hole and a insert hole in an outer upper side. The bridge has two sides and upper ends of said two nose pads and the connecting member of each temple respectively have a bent insert end to fit and stabilized in the through holes and the insert holes of said two lenses and screwed tightly by the bolts and nuts so that the bridge, the two nose pads and the two temples may be combined with the two lenses stably and quickly, reducing the weight of a frame and the weight load of the nose and the ears of a wearer, who can wear the eyeglasses with comfort, with the eyeglasses having an elegant appearance.

3 Claims, 5 Drawing Sheets

EYEGLASSES

BACKGROUND OF THE INVENTION

This invention relates to a pair of glasses, particularly to one having no frames, two lenses directly connected with a bridge, and two temples also directly connected with the two lenses separately, reducing the whole weight of the pair of glasses and assembled stably for a user to wear comfortably.

Common conventional eyeglasses 1 shown in FIG. 1 generally have a frame 10, a hinges 11 each at two ends of the frame, and a temple 12 pivotally connected to a rear side of each hinge 11, a bridge 13 provided in a middle portion of the frame, two pads 14 pivotally connected to under the bridge 13, and two lenses 15 combined with the frame 10. As conventional eyeglasses have a rather heavy weight, the nose and two ears of a wearer may feel comparatively large load if worn for a continual long period of time. Then the wearer may feel discomfort in the nose and the ears, and headache if worse, unable to wear them for a long time continuously.

SUMMARY OF THE INVENTION

The objective of the invention is to offer a pair of eyeglasses having a lightweight and stably assembly for a wearer to feel comfort.

One feature of the invention is two lenses provided with a through hole and two insert holes in an inner upper side for combining a bridge having two bent insert ends fitting in the insert holes of the two lenses in a stabilized condition, and a bolt inserting in said through hole to screw with a nut tightly and having a head with a through hole for the bridge to pass through.

Another feature of the invention is the two lenses provided with a through hole and an insert hole in an outer upper side for combining two bent insert ends of a connecting member formed in a front end of each temple, and the connecting member having a bent insert end to fit and stabilized in the insert hole of each lens, and a bolt inserting in the through hole to screw with a nut tightly and having a head with a hole for the connecting member to fit in.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
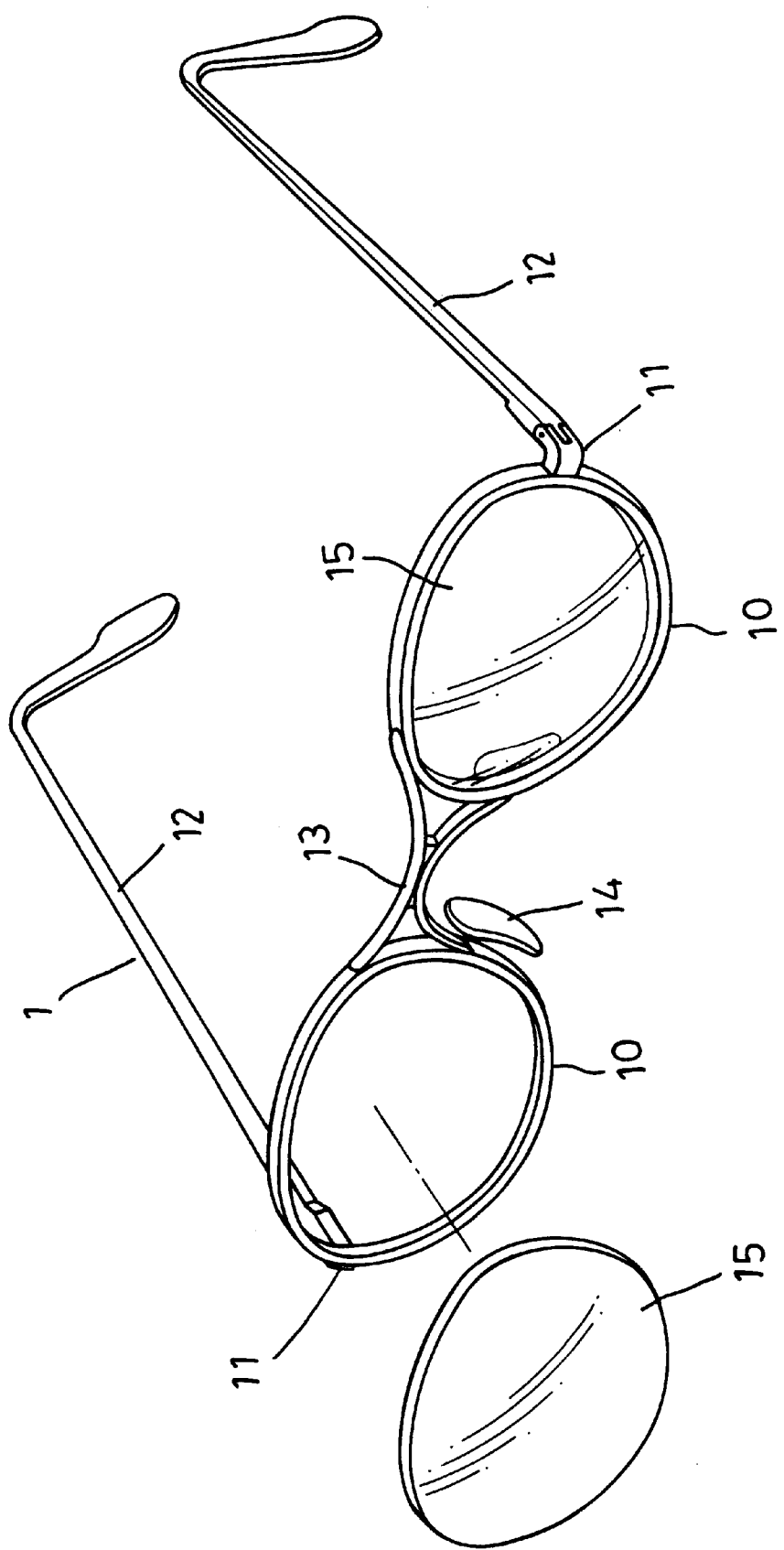
FIG. 1 is a perspective view of a pair of common conventional eyeglasses.
Figure 2:
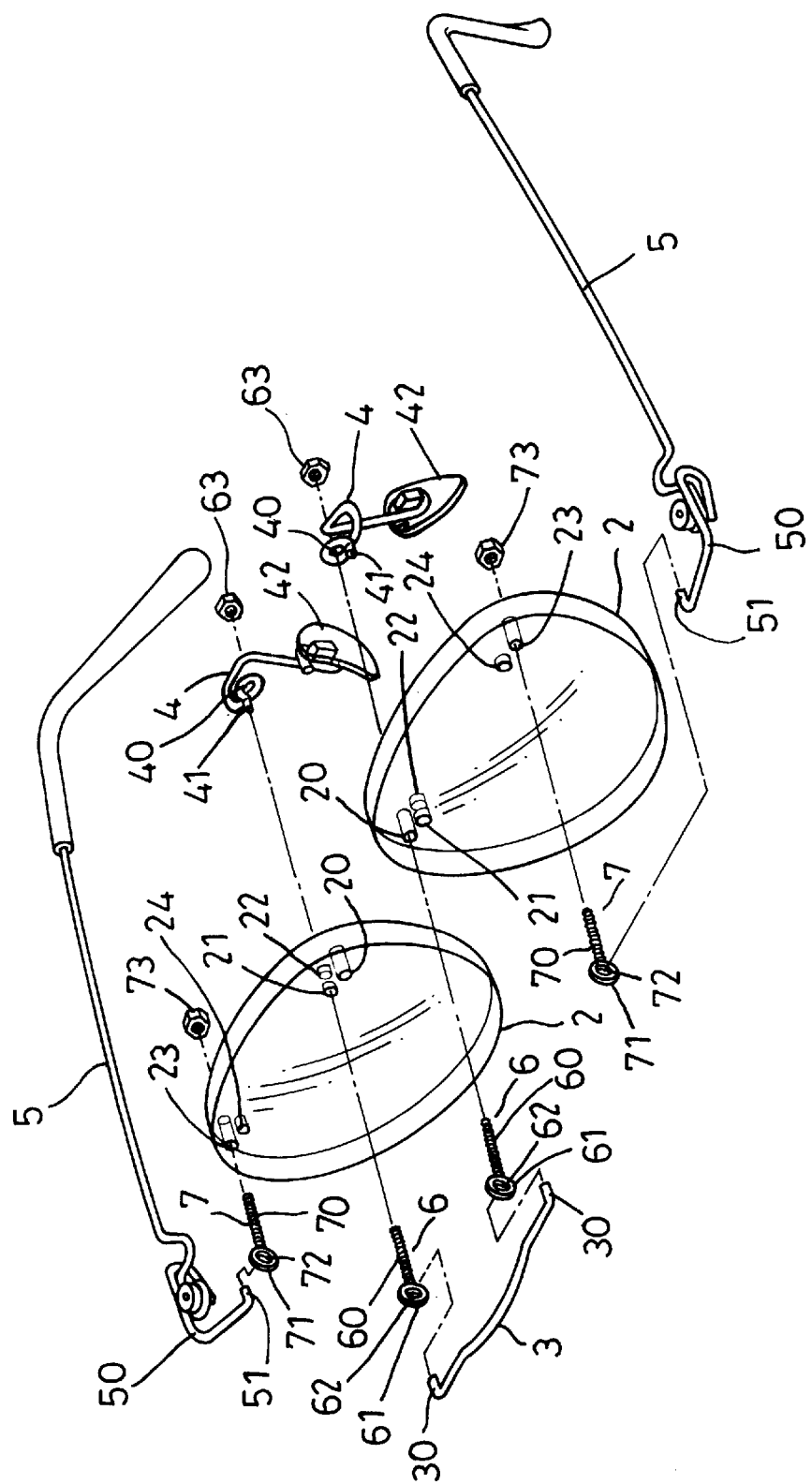
FIG. 2 is an exploded perspective view of a pair of eyeglasses in the present invention.
Figure 3:
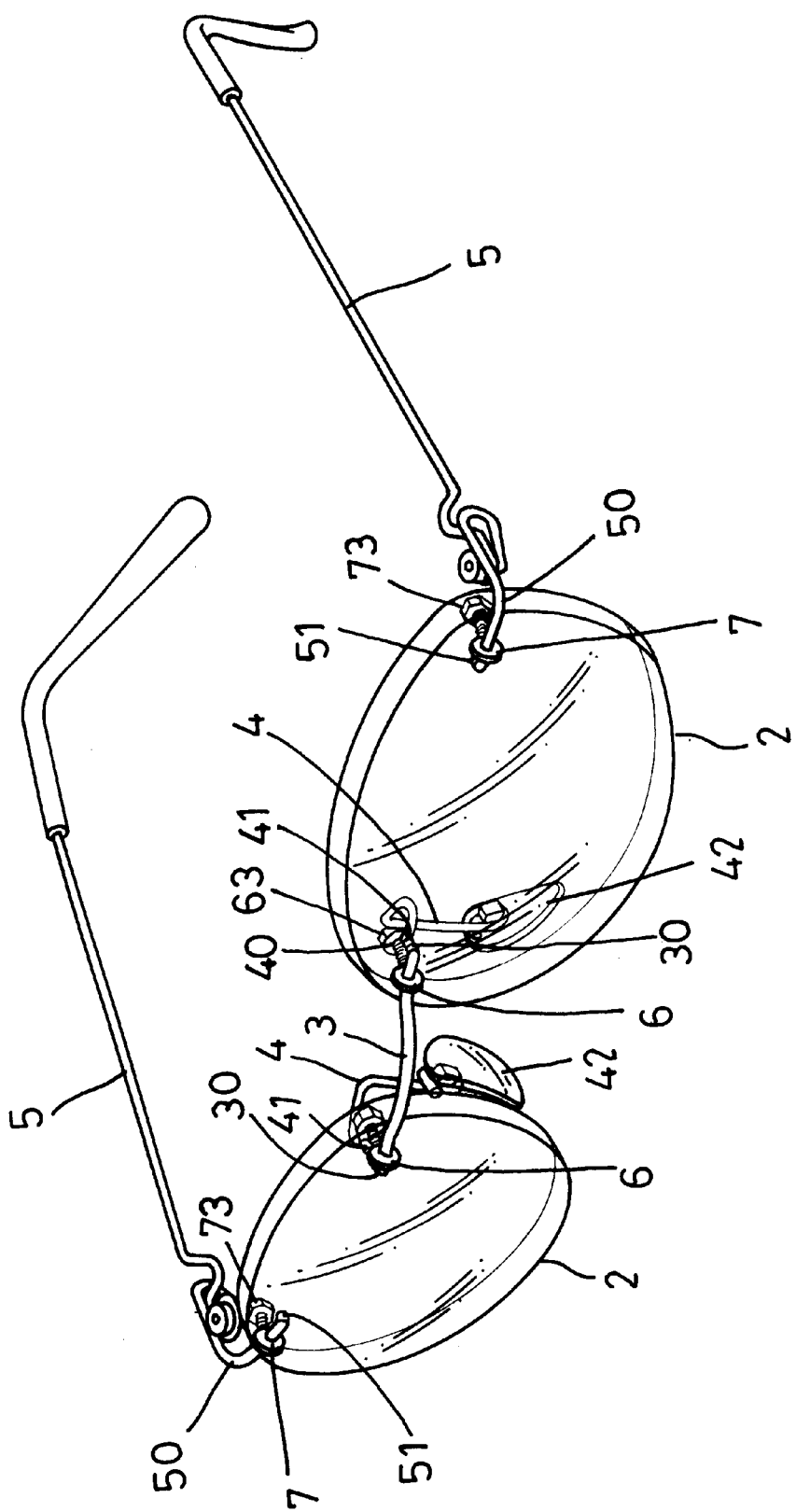
FIG. 3 is a perspective view of the pair of eyeglasses in the present invention.
Figure 4:
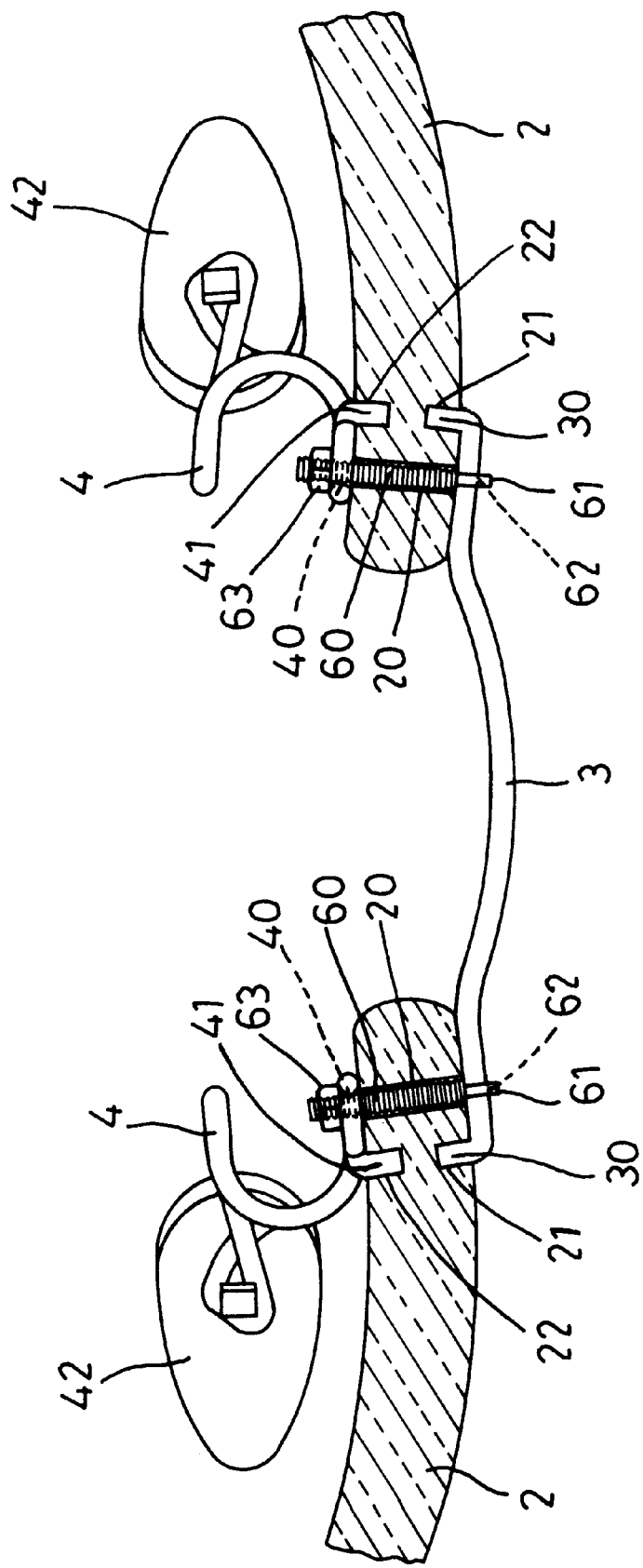
FIG. 4 is a cross-sectional view of a bridge, two nose pads and two lenses combined together in the present invention; and, FIG. 5 is a cross-sectional view of a temple and a lens combined together in the present invention.
Figure 5:
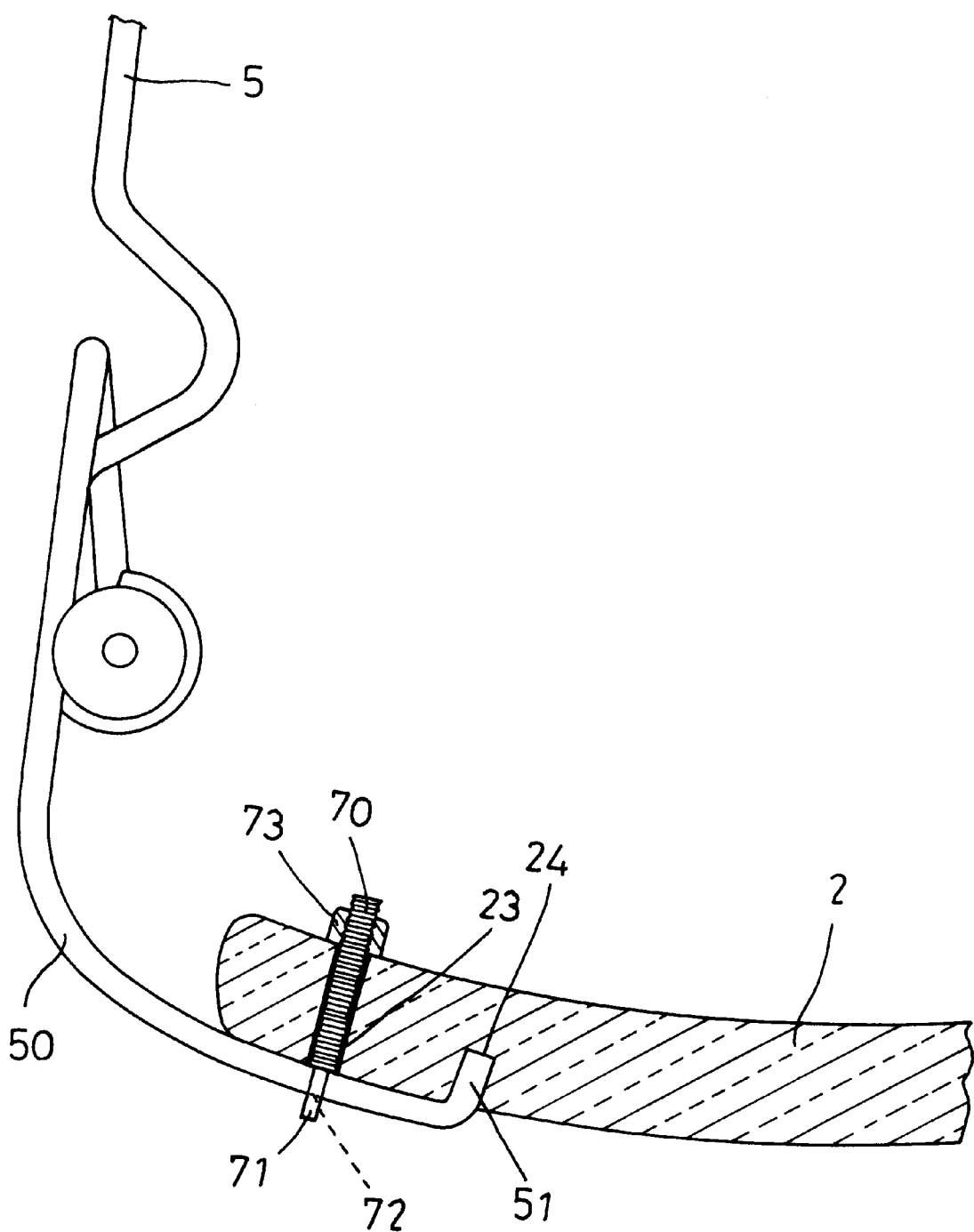

A preferred embodiment of a pair of eyeglasses in the present invention, as shown in FIG. 2, includes two lenses 2, a bridge 3, two nose pads 4, two temples 5 and two sets of bolts 6, 7 combined together.

The two lenses 2 have respectively a through hole 20 in an inner upper side, two insert holes 21, 22 bored respectively beside and inward the through hole 20, a through hole 23 in an outer upper side, and an insert hole 24 bored near and inward the through hole 23.

The bridge 3 is positioned between the two lenses 2, connecting the lenses 2 together, and having a bent insert end 30 formed respectively at two ends and inserting in the insert hole 21 of each lens 2 firmly.

The two nose pads 4 are positioned and aligned with each other at inner sides of the two lenses 2, having an insert hole 40 formed with wires or the like bent and an end of the wire formed as a bent insert end 41, and a pad 42 fitted with another end of the wire.

The two temples 5 respectively have a connecting member 50 formed in a front end portion, a bent insert end 51 formed in its end, and inserting in the insert hole 24 of each lens 2.

The two bolts 6, 7 respectively fits through the two through holes 20, 23 of each lens 2, securing the bridge 3 and two nose pads 4 and the connecting members 50 of the two temples 5 together. Each bolt 6, 7 has a threaded shank 60, 70 and a head 61, 71 with a through hole 62, 72 formed in each head 61, 71, and a nut screwing tightly with an end of each threaded shank 60, 70.

In assembling, as shown in FIGS. 2, 3, 4 and 5, firstly the two end portions of the bridge 3 are respectively inserted and extend out of the through hole 62 of the head 1. Then the threaded shanks 60, 70 of the two bolts 6, 7 fit in and protrude out of the two through holes 20 of the two lenses 2 to the inner sides. Then the two bent insert ends 30 of the bridge 3 fit in the insert holes 21 of the two lenses 2, positioning the two lenses 2 separated with a proper distance. Next, the through holes 40 of two nose pads 4 are respectively fitted around the two threaded shanks 60, 70 located in an inner side of the two lenses 2, with the bent insert ends 41 inserted in the insert holes 22 and screwed with a nut 63 tightly. The heads 61, 71 may press the bridge 3 against the surfaces of the two lenses 2 to closely contact the surface of the two lenses 2, with the two bent insert ends 30 fitting tightly in the insert holes 21 of the two lenses 2, securing the two lenses 2 with the bridge 3. Then the two pads 4 have two insert ends 41 fitting firmly in the insert holes 22 of the two lenses by means of the nuts 63, securing the two nose pads 4 positioned and aligned with each other inside the two lenses 2. Lastly, the connecting members 50 of the two temples 5 have the bent insert ends protruding the through holes 62, 72 of the heads 61, 71 of the bolts 6, 7, with the rear ends of the threaded shanks 60, 70 respectively protruding through the through holes 23 of the two lenses 2. At the same time, the bent insert end 51 of the connecting member 50 of each temple 5 is inserted through the insert hole 24 to screw with a nut 73 tightly. Then the heads 61, 71 of the bolts 6, 7 press the connecting members 50 against the surfaces of the two lenses 2 to closely contact the surfaces thereof. Therefore, the connecting members 50 of the two temples 5 may have the bent insert ends 51 stably inserted in the insert holes 24 of the lenses 2, securing the two temples 5 with the rear sides of the lenses 2. Then assembly of the eyeglasses is finished with fastness and convenience.

In general, the eyeglasses in the invention have no frames, with a lightweight for a wearer to feel comfortable and with the weight load on the nose and the two ears of the wearer reduced. In addition, the bridge 3, the nose pads 4 and the temples 5 are made of light and elastic material, not altered in its configuration of the eyeglasses even if they receive outer shock, and having a beautiful appearance and comfort in wearing.

While the preferred embodiment of the invention has been described above, it will be recognized and understood that various modifications may be made therein, and the appended claims are intended to cover all such modifications that may fall within the spirit and scope of the invention.

What is claimed is:

1. Eyeglasses comprising two lenses respectively provided with a through hole in an inner upper side, two insert holes bored beside each said through hole, a bridge positioned between said two lenses and having two bent ends to insert said insert hole of each said lens stably, bolts inserting through said through holes of said lenses and having rear threaded shanks and heads at the front of said threaded shanks, each said head having a through hole respectively for two ends of said bridge to pass through, said two end portion of said bridge respectively fitting in said through holes of said heads of said bolts, said bent ends of said bridge inserted in said two lenses so as to secure them together with stability, facilitating assembly of said eyeglasses with fastness.

2. The eyeglasses as claimed in claim 1, wherein a nose pad is respectively deposited at an inner side of said two lenses, having an insert hole formed with a wire bent for said bolts extending through said insert holes of said lenses to pass through to be secured stably, an outer end of each said nose pad formed into a bent insert end, each said nose pad having a pad at lower end, said two lenses each having an insert hole located in an inner upper side of each said lens for said bent insert end of each said nose pad to fit therein and secured.

3. Eyeglasses comprising two lenses, said lenses respectively having a through hole and an insert hole beside said through hole in an outer upper side, two temples combined with the outer side of said lenses, each said temple having a connecting member formed in an front portion, each said connecting member having a bent insert end fitting in said insert hole in said outer side of each said lens stabilized, bolts provided to protrude through said through holes of said lenses, said bolts respectively having a rear threaded shank and a head in front of said shank, said head having a through hole for said connecting member of each said temple to fit through therein, said bent end of said connecting member fitting and stabilized in said insert hole in the outer side of each said lens, tight screwing said bolts with nuts to secure said two temples respectively with the outer sides of said two lenses with fastness and convenience.

* * * * *